(12) United States Patent
Hadley et al.

(10) Patent No.: US 12,423,100 B1
(45) Date of Patent: Sep. 23, 2025

(54) PREFETCH PATTERN SELECTION

(71) Applicant: Arm Limited, Cambridge (GB)

(72) Inventors: Scott Courtland Hadley, Austin, TX (US); Devin S. Lafford, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/609,454

(22) Filed: Mar. 19, 2024

(51) Int. Cl.
*G06F 9/30* (2018.01)
*G06F 9/32* (2018.01)
*G06F 9/38* (2018.01)

(52) U.S. Cl.
CPC .......... *G06F 9/30047* (2013.01); *G06F 9/321* (2013.01); *G06F 9/3802* (2013.01)

(58) Field of Classification Search
CPC ..... G06F 9/30047; G06F 9/321; G06F 9/3802
See application file for complete search history.

(56) References Cited

U.S. PATENT DOCUMENTS

| | | | |
|---|---|---|---|
| 9,098,418 B2 * | 8/2015 | Kannan | G06F 8/4442 |
| 9,292,447 B2 * | 3/2016 | Roy | G06F 12/0875 |
| 9,582,282 B2 * | 2/2017 | Hayenga | G06F 9/3816 |
| 10,417,130 B2 * | 9/2019 | Brekelbaum | G06F 3/06 |
| 10,540,287 B2 * | 1/2020 | Brekelbaum | G06F 12/0862 |
| 10,846,084 B2 * | 11/2020 | Nori | G06F 9/3814 |
| 11,526,356 B2 * | 12/2022 | Cai | G06F 9/544 |
| 11,675,702 B1 * | 6/2023 | Castorina | G06F 9/3832 |
| | | | 711/118 |
| 11,907,722 B2 * | 2/2024 | Maroncelli | G06F 9/383 |
| 2024/0184581 A1 * | 6/2024 | Alexander | G06F 12/0862 |

* cited by examiner

*Primary Examiner* — Corey S Faherty
(74) *Attorney, Agent, or Firm* — NIXON & VANDERHYE P.C.

(57) ABSTRACT

There is provided an apparatus, a system, a chip containing product, a method, and a computer-readable medium. The apparatus comprises pattern storage circuitry to store information indicative of a plurality of prefetch patterns, each prefetch pattern indicating a trigger access request and comprising pattern information associated with the trigger access request. The pattern information is indicative of one or more addresses to be used for generation of prefetch requests. The apparatus also comprises control circuitry responsive to an observation of the trigger access request indicated in a prefetch pattern to determine whether the prefetch pattern is selected for training by prefetch training circuitry. Each of the plurality of prefetch patterns comprises back-off information indicating a back-off period during which the prefetch pattern is to be overlooked for the training. The control circuitry is responsive to the prefetch pattern being selected for the training to update the back-off information.

20 Claims, 10 Drawing Sheets

PREFETCH PATTERN SELECTION

TECHNICAL FIELD

The present invention relates to data processing. Furthermore, the present invention relates to an apparatus, a system, a chip containing product, a method, and a non-transitory computer-readable medium.

BACKGROUND

Some apparatuses store prefetch patterns indicative of addresses to be used for the generation of prefetch requests. The prefetch patterns may be selected to be trained by prefetch training circuitry.

SUMMARY

According to a first aspect of the present techniques there is provided an apparatus comprising:
   pattern storage circuitry configured to store information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry; and
   control circuitry responsive to an observation of the trigger access request indicated in a prefetch pattern of the plurality of prefetch patterns to perform a determination of whether the prefetch pattern is selected for training by prefetch training circuitry,
   wherein:
   each of the plurality of prefetch patterns comprises back-off information indicating a back-off period during which the prefetch pattern is to be overlooked for the training; and
   the control circuitry is responsive to the prefetch pattern being selected for the training to update the back-off information.

According to a second aspect of the present technology there is provided a system comprising:
   the apparatus of the first aspect, implemented in at least one packaged chip;
   at least one system component; and
   a board,
   wherein the at least one packaged chip and the at least one system component are assembled on the board.

According to a third aspect of the present technology there is provided a chip-containing product comprising the system of the third aspect, wherein the system is assembled on a further board with at least one other product component.

According to a fourth aspect of the present technology there is provided a method comprising:
   storing, in pattern storage circuitry, information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry;
   in response to an observation of the trigger access request indicated in a prefetch pattern of the plurality of prefetch patterns performing a determination of whether the prefetch pattern is selected for training by prefetch training circuitry,
   wherein each of the plurality of prefetch patterns comprises back-off information indicating a back-off period during which the prefetch pattern is to be overlooked for the training; and
   in response to the prefetch pattern being selected for the training updating the back-off information.

According to a fifth aspect of the present technology there is provided a non-transitory computer-readable medium storing computer-readable code for fabrication of an apparatus comprising:
   pattern storage circuitry configured to store information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry; and
   control circuitry responsive to an observation of the trigger access request indicated in a prefetch pattern of the plurality of prefetch patterns to perform a determination of whether the prefetch pattern is selected for training by prefetch training circuitry,
   wherein:
   each of the plurality of prefetch patterns comprises back-off information indicating a back-off period during which the prefetch pattern is to be overlooked for the training; and
   the control circuitry is responsive to the prefetch pattern being selected for the training to update the back-off information.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
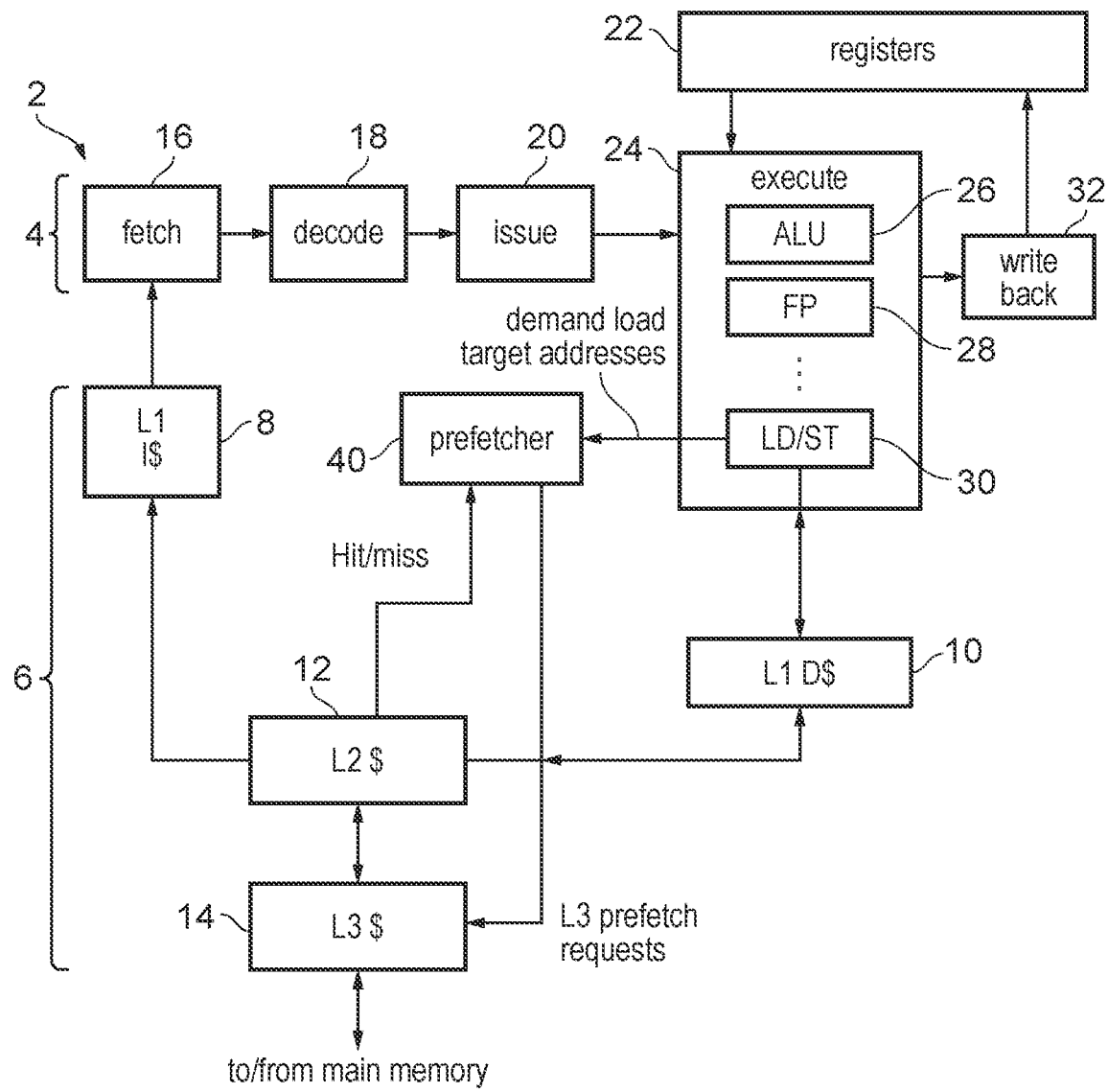
FIG. 1 schematically illustrates an apparatus according to some configurations of the present techniques.

Before discussing the configurations with reference to the accompanying figures, the following description of configurations is provided.

According to some configurations of the present techniques there is provided an apparatus comprising pattern storage circuitry configured to store information indicative of a plurality of prefetch patterns, each of the plurality of prefetch patterns indicating a trigger access request and comprising pattern information associated with the trigger access request. The pattern information is indicative of one or more addresses to be used for generation of prefetch requests to prefetch data into local storage circuitry in advance of a demand request for the data by processing circuitry. The apparatus is also provided with control circuitry responsive to an observation of the trigger access request indicated in a prefetch pattern of the plurality of prefetch patterns to perform a determination of whether the prefetch pattern is selected for training by prefetch training circuitry. Each of the plurality of prefetch patterns comprises back-off information indicating a back-off period during which the prefetch pattern is to be overlooked for the training. The control circuitry is responsive to the prefetch pattern being selected for the training to update the back-off information.

Prefetch patterns are stored indicating a trigger access request and pattern information associated with that access request. The trigger access request may be an access request that has been observed to be followed by one or more further access requests for data stored at addresses (e.g., virtual addresses or physical addresses) indicative of locations in memory that are observed to be accessed subsequent to the trigger access request. Training of such prefetch patterns may include observation of a trigger access request and the recording of memory locations accessed subsequent to that trigger access request. The training may be based on observations of sequences of demand requests and/or sequences of prefetch requests, e.g., issued by one or more instances of prefetch generation circuitry implementing one or more prefetch algorithms. Where a plurality of prefetch patterns are stored, it may not be practical to train all of the plurality of prefetch patterns in one go, for example, due to circuit size or power considerations. Sampling techniques, for example training every N-th trigger access, where N is a positive integer, can reduce the area and power considerations associated with training. The inventors of the present techniques have recognised that such an approach can cause frequently observed access patterns to dominate the training whilst preventing prefetch patterns associated with less frequently observed trigger access requests from being trained. The prefetch patterns stored in the pattern storage circuitry are provided with back-off information indicating a period during which that prefetch pattern is to be overlooked for training. The back-off information is updated in response to a pattern being successfully selected for training. In this way, the back-off information can be used to ensure that prefetch patterns having a trigger access that occurs frequently can have their back-off information set such that they are selected less frequently (overlooked more often), than prefetch patterns having a trigger access that occurs infrequently. Advantageously, this approach prevents frequently observed patterns from monopolising the prefetch training circuitry and allows infrequently observed (yet still potentially useful) prefetch patterns to receive attention by the training circuitry.

Whilst, in some configurations, the back-off period may be a fixed duration, in some configurations a duration of the back-off period is variable. The duration of the back-off period could be varied, for example, based on a total number of prefetch patterns stored in the pattern storage circuitry, a rate at which the access requests are received, and/or the frequency with which the trigger access associated with that back-off period are observed.

In some configurations the control circuitry is configured, when updating the back-off information, to vary the duration of the back-off period in dependence on a number of times the prefetch pattern has been selected for training during a training window. A more frequently selected prefetch pattern may have its back-off period set to a greater duration than a less frequently selected prefetch pattern. This approach can ensure an improved distribution of prefetch patterns that access the training circuitry.

In some configurations the duration is dependent on a training counter associated with the prefetch pattern, the training counter indicative of the number of times the prefetch pattern has been selected for the training during the training window. As the training counter increases, the duration of the back-off period that is set for that prefetch pattern can also be increased, thereby decreasing the likelihood that the same prefetch pattern will be selected as the next prefetch pattern to be trained by the prefetch training circuitry.

A length of the training window can be defined using any metric associated with the processing circuitry. In some configurations the training window comprises a predetermined number of prefetch patterns being selected for the training. Alternatively, the training window may comprise a predetermined number of cycles or a predetermined total number of memory accesses.

In some configurations updating the back-off information comprises setting the duration to an integer multiple of the training counter. Increasing the back-off period linearly in dependence on the training counter causes an increase in the likelihood that another prefetch pattern will receive training each time that prefetch pattern is selected and results in a gradual decrease in the frequency at which a given prefetch pattern is selected for training.

In some configurations updating the back-off information comprises setting the duration such that a logarithm of the duration is linearly related to the training counter. Setting the duration such that a logarithm of the duration is linearly related to the training counter causes the duration to increase exponentially with the training counter. The use of exponential back-off rapidly decreases the likelihood that a frequently occurring trigger access will be selected for training.

In some configurations the control circuitry, when performing the determination, is responsive to the back-off information indicating a non-zero back-off period, to overlook the prefetch pattern and to decrease the back-off period. The non-zero back-off period may therefore identify the number of times that the prefetch pattern is to be overlooked. The back-off information may directly record the back-off period, e.g., it may be a number identifying the number of times that the prefetch pattern is to be overlooked. Alternatively, the back-off information may encode the back-off period along with other identifying information for the back-off period or using a non-linear metric. For example, a zero back-off period may be encoded using a non-zero binary number which is interpreted by the control circuitry as corresponding to a zero back-off period.

In some configurations the control circuitry is configured to reset the back-off information associated with each of the plurality of prefetch patterns in response to a predetermined condition being met. Resetting the back-off counters periodically, i.e., in response to the predetermined condition being met, can reduce the likelihood that the total rate at which patterns are selected for training decreases significantly. This could occur, for example, in situations where memory accesses are dominated by a single pattern.

The predetermined condition can be based on any metric of the apparatus. In some configurations the predetermined condition is met when a total number of prefetch patterns selected for the training has exceeded a selected prefetch pattern threshold. The selected prefetch pattern threshold may be hardwired into the apparatus or may be configurable, for example, it may be modifiable based on one or more instructions of an instruction set architecture to allow a compiler and/or programmer to modify the selected prefetch pattern threshold.

In some configurations the predetermined condition is met when a combination of a total number of prefetch patterns selected for training and a total number of prefetch patterns overlooked for training has exceeded a total prefetch pattern threshold. The total prefetch pattern threshold may be hardwired or may be configurable, for example, it may be modifiable based on one or more instructions of an instruction set architecture to allow a compiler and/or programmer to modify the total prefetch pattern threshold. In some configurations, the threshold used for the predetermined condition, e.g., whether the selected prefetch pattern threshold or the total prefetch pattern threshold is used may be configurable.

The selected prefetch pattern threshold may be set to a number less than a total training period. For example, a training period of 256 accesses may be used and the selected prefetch pattern threshold may be set to, e.g., 32 or 64 selected or total accesses. Alternatively, where the total prefetch pattern threshold is used, the total prefetch pattern threshold may be set to a number significantly greater than the training period as a large number of prefetches may be overlooked, for example, due to their respective back-off counters being non-zero.

Whilst the back-off period may be fixed, in some configurations the back-off period is determined based on a configurable parameter. The apparatus may be responsive to one or more instructions, e.g., instructions of an instruction set architecture, that allow the configurable parameter to be changed. The back-off period may be set based on one or more memory mapped registers allowing the back-off period to be modified by writing to the one or more memory mapped registers. In some configurations, the back-off period may be different for different processing contexts.

In some configurations the apparatus comprises prefetch generation circuitry responsive to receipt of an access request to perform a lookup in the pattern storage circuitry to determine if the access request corresponds to a trigger access request indicated in one of the plurality of prefetch patterns, wherein the prefetch generation circuitry is responsive to the lookup resulting in a hit, to generate the prefetch requests based on the one or more addresses indicated in the prefetch pattern of the plurality of prefetch patterns that resulted in the hit. The trigger access request may be a demand request from the processing circuitry or it may be a prefetch request, for example, issued by a further set of prefetch generating circuitry implementing a different prefetch algorithm.

In some configurations the prefetch generation circuitry is one of: a spatial prefetcher; a temporal prefetcher; and/or an indirect prefetcher. The spatial prefetcher may be a spatial memory streaming (SMS) prefetcher. The prefetch generation circuitry may be provided as one of a plurality of prefetchers associated with processing circuitry comprised in the apparatus.

In some configurations the pattern storage circuitry is updated in response to completion of the training. Whilst some implementations may allow only a single pattern to be trained at a time, in some configurations multiple patterns may be trained in parallel. For example, in some configurations, an indirect prefetcher may train two different prefetch patterns in parallel (or overlapped with one another). Alternatively, for an SMS prefetcher, the training circuitry may train 16 prefetch patterns, 32 prefetch patterns, or 64 prefetch patterns in parallel.

In some configurations the training comprises recording information indicative of the one or more addresses observed subsequent to the trigger access request. The one or more addresses may be recorded as full addresses. Alternatively, the one or more addresses may be recorded as offsets from the trigger access request and/or as offsets from the value returned by the trigger access request. The one or more addresses may correspond to addresses in a same region of memory, e.g., sharing a same base address as the trigger access request.

Particular configurations will now be described with reference to the figures.

FIG. 1 illustrates an example of a data processing apparatus 2. The apparatus has a processing pipeline 4 for processing program instructions fetched from a memory system 6. The memory system in this example includes a level 1 instruction cache 8, a level 1 data cache 10, a level 2 cache 12 shared between instructions and data, a level 3 cache 14, and main memory which is not illustrated in FIG. 1 but may be accessed in response to requests issued by the processing pipeline 4. It will be appreciated that other examples could have a different arrangement of caches with different numbers of cache levels or with a different hierarchy regarding instruction caching and data caching (e.g. different numbers of levels of cache could be provided for the instruction caches compared to data caches).

The processing pipeline 4 includes a fetch stage 16 for fetching program instructions from the instruction cache 8 or other parts of the memory system 6. The fetched instructions are decoded by a decode stage 18 to identify the types of instructions represented and generate control signals for controlling downstream stages of the pipeline 4 to process the instructions according to the identified instruction types. The decode stage passes the decoded instructions to an issue stage 20 which checks whether any operands required for the instructions are available in registers 22 and issues an instruction for execution when its operands are available (or when it is detected that the operands will be available by the time they reach the execute stage 24). The execute stage 24 includes a number of functional units 26, 28, 30 for performing the processing operations associated with respective types of instructions. For example, in FIG. 1 the execute stage 24 is shown as including an arithmetic/logic unit (ALU) 26 for performing arithmetic operations such as add or multiply and logical operations such as AND, OR, NOT, etc. Also the execute unit includes a floating point unit 28 for performing operations involving operands or results represented as a floating-point number. Also the functional units include a load/store unit 30 for executing load instructions to load data from the memory system 6 to the registers 22 or store instructions to store data from the registers 22 to the memory system 6. Load requests issued by the load/store unit 30 in response to executed load instructions may be referred to as demand load requests discussed below. Store requests issued by the load/store unit 30 in response to executed store instructions may be referred to as demand store requests. The demand load requests and demand store requests may be collectively referred to as demand memory access requests. It will be appreciated that the functional units shown in FIG. 1 are just one example, and other examples could have additional types of functional units, or could have multiple functional units of the same type, or may not include all of the types shown in FIG. 1 (e.g. some processors may not have support for floating-point processing). The results of the executed instructions are written back to the registers 22 by a write back stage 32 of the processing pipeline 4.

It will be appreciated that the pipeline architecture shown in FIG. 1 is just one example and other examples could have additional pipeline stages or a different arrangement of pipeline stages. For example, in an out-of-order processor a register rename stage may be provided for mapping architectural registers specified by program instructions to physical registers identifying the registers 22 provided in hardware. Also, it will be appreciated that FIG. 1 does not show all of the components of the data processing apparatus and that other components could also be provided. For example, a branch predictor may be provided to predict outcomes of branch instructions so that the fetch stage 16 can fetch subsequent instructions beyond the branch earlier than if waiting for the actual branch outcome. Also a memory management unit could be provided for controlling address translation between virtual addresses specified by the program instructions and physical addresses used by the memory system.

As shown in FIG. 1, the apparatus 2 has a prefetcher 40 for analysing patterns of demand target addresses specified by demand memory access requests issued by the load/store unit 30, and detecting patterns of addresses that are accessed. The prefetcher 40 uses the detected patterns to generate prefetch load requests which are issued to the memory system 6 to request that data is brought into a given level of cache. The prefetch load requests are not directly triggered by a particular instruction executed by the pipeline 4, but are issued speculatively with the aim of ensuring that when a subsequent load/store instruction reaches the execute stage 24, the data it requires may already be present within one of the caches, to speed up the processing of that load/store instruction and therefore reduce the likelihood that the pipeline has to be stalled. The prefetcher 40 may be able to perform prefetching into a single cache or into multiple caches. For example, FIG. 1 shows an example of the prefetcher 40 issuing level 2 cache prefetch requests which are sent to the level 3 cache 14 or downstream memory and request that data from prefetch target addresses is brought into the level 2 data cache 12.

The prefetcher 40 may, in some configurations, also issue level 1 prefetch requests to the level 2 data cache 12 that prefetch data from prefetch target addresses into the level 1 cache 10. Level 3 prefetch request may look a longer distance into the future than the level 1 prefetch requests to account for the greater latency expected in obtaining data from main memory into the level 3 cache 14 compared to obtaining data from a level 2 cache into the level 1 cache 10.

In systems using both level 1 and level 2 prefetching, the level 2 prefetching can increase the likelihood that data requested by a level 1 prefetch request is already in the level 2 cache 12. However, it will be appreciated that the particular caches loaded based on the prefetch requests may vary depending on the particular circuit of implementation.

Figure 2:
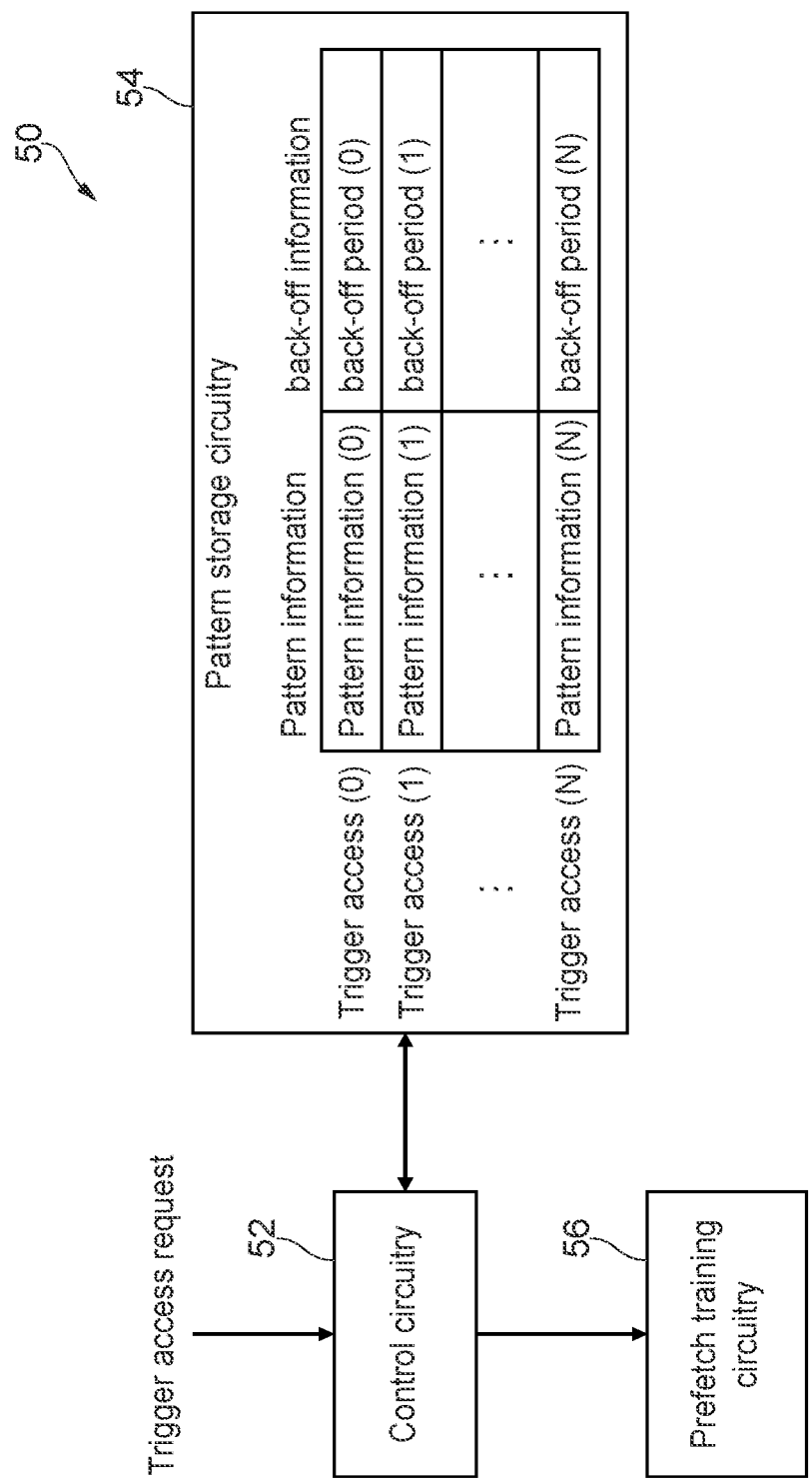
FIG. 2 schematically illustrates an apparatus according to some configurations of the present techniques.

FIG. 2 schematically illustrates an apparatus 50 comprising control circuitry 52, pattern storage circuitry 54, and prefetch training circuitry 56. The pattern storage circuitry 54 is configured to store a plurality of prefetch patterns. Each of the plurality of prefetch patterns associates a trigger access with pattern information and back-off information. The pattern information identifies a set of addresses to be accessed in response to the trigger access associated with that pattern being observed. The back-off information identifies whether the pattern comprising that back-off information is eligible to be selected for training or whether that pattern should be overlooked for training when the trigger access request is next selected. The control circuitry 52 is responsive to trigger access requests to determine patterns of the pattern storage circuitry 54 that are to be selected for training by the prefetch training circuitry 56. During a training period, the control circuitry 52 receives trigger access requests and, when the prefetch training circuitry has capacity to train a further pattern, performs a lookup in the pattern storage circuitry based on the trigger access requests, for example, based on a hash of the address indicated in the trigger access request. When the trigger access request hits on a pattern in the pattern storage circuitry, the control circuitry determines whether the back-off information associated with that access request indicates that the pattern is eligible for training. When the pattern is eligible for training, the pattern is passed to the prefetch training circuitry 56 for training and the back-off information is updated. When the pattern is ineligible for training, the control circuitry 52 overlooks the trigger access request and does not send that pattern for training by the prefetch training circuitry 56. When the lookup in the pattern storage circuitry misses, the control circuitry 52 may pass the trigger access request to the prefetch training circuitry 56 to begin training a new pattern. Once the prefetch training circuitry 56 indicates that the training is complete, the trained prefetch pattern is passed back to the pattern storage circuitry 54 to be stored.

Figure 3A:
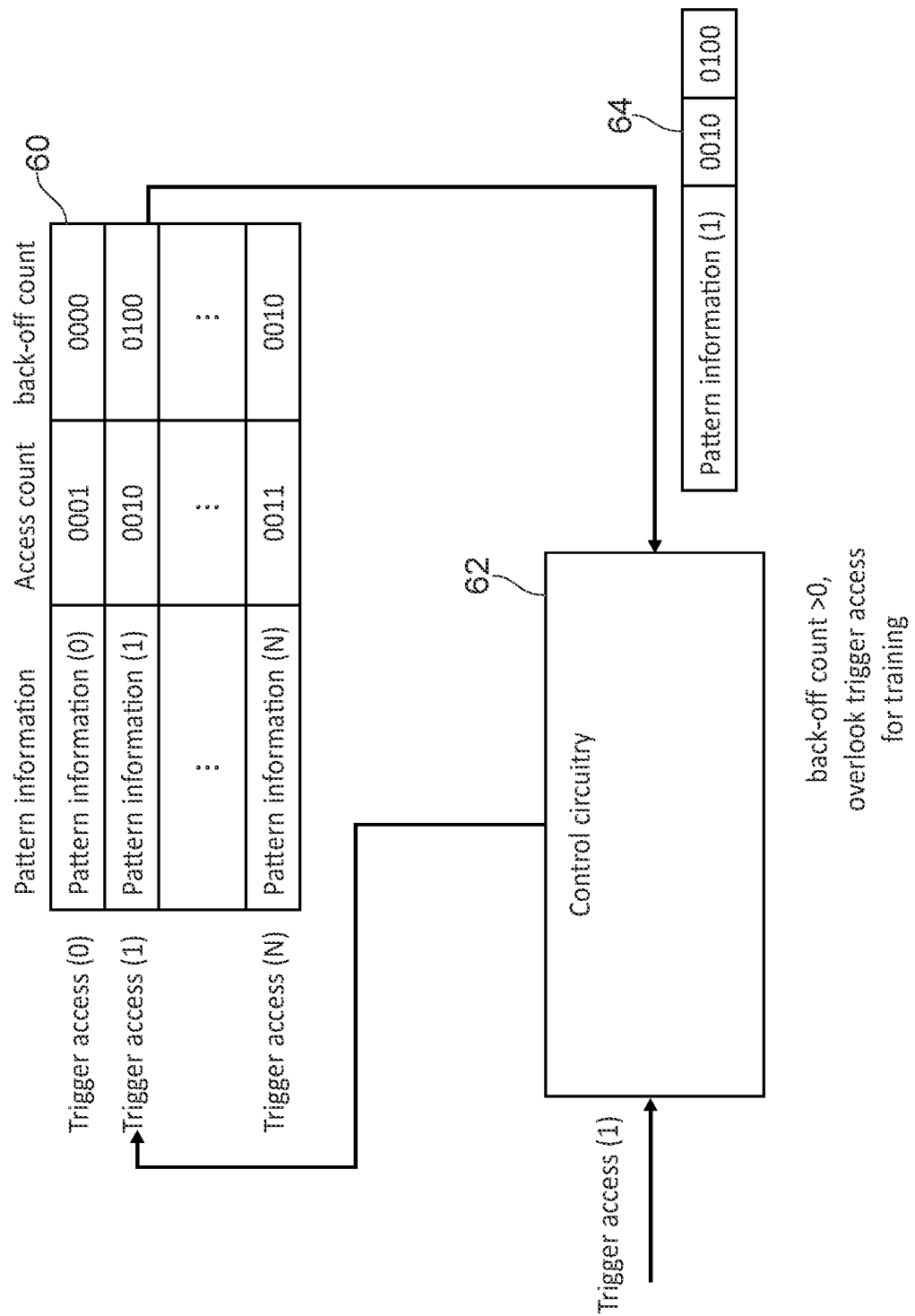
FIG. 3a schematically illustrates an apparatus according to some configurations of the present techniques.
Figure 3B:
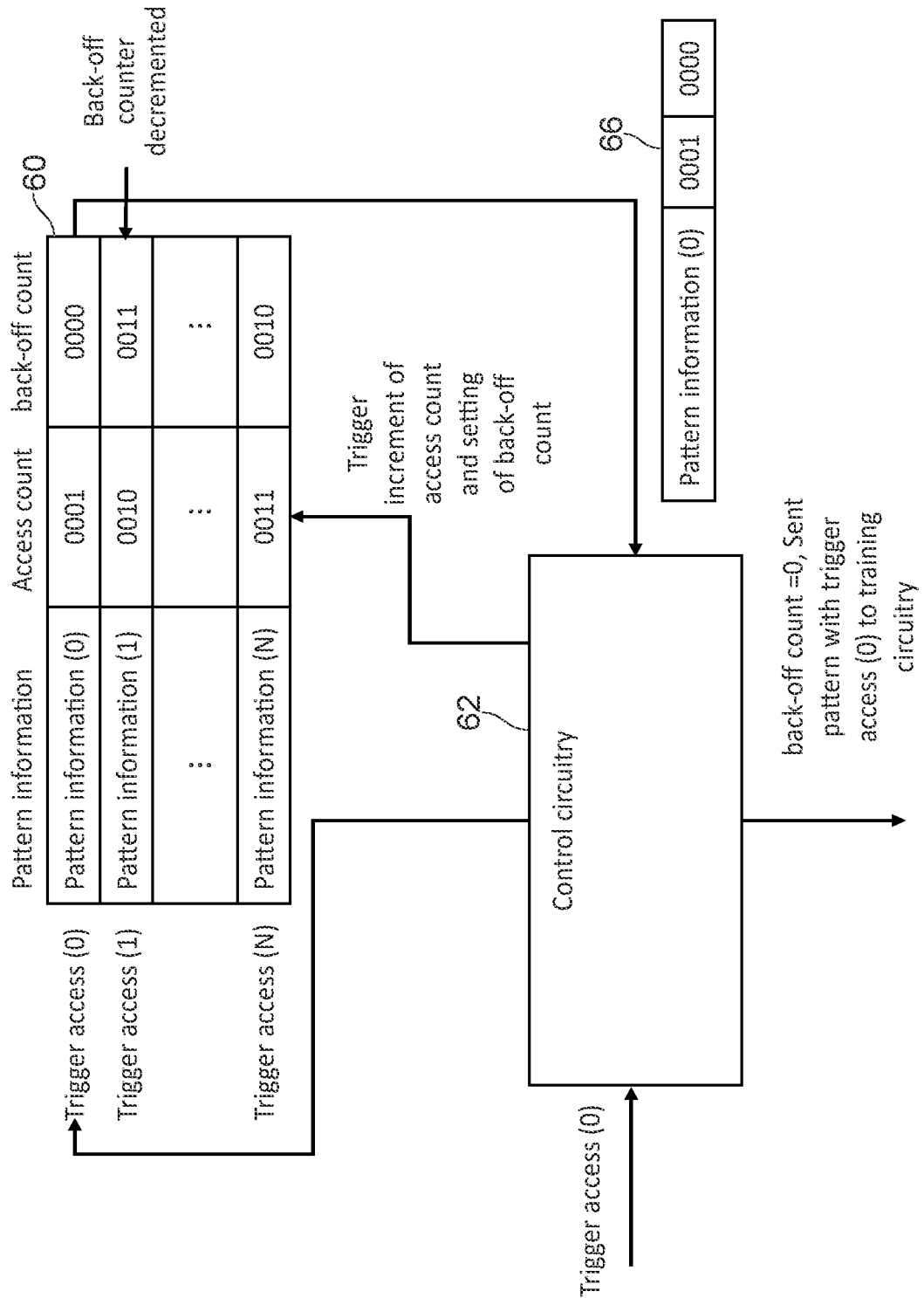
FIG. 3b schematically illustrates an apparatus according to some configurations of the present techniques.
Figure 3C:
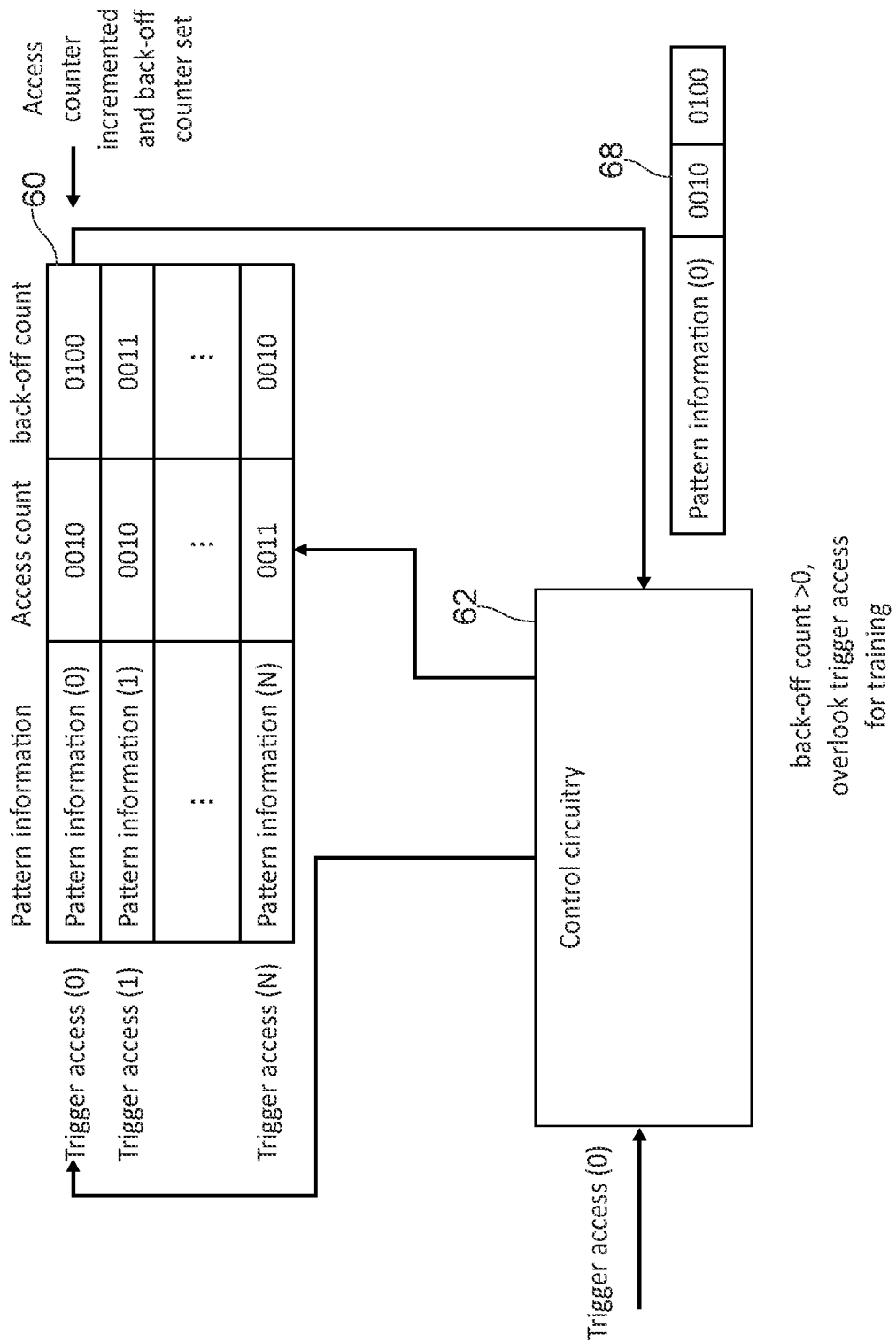
FIG. 3c schematically illustrates an apparatus according to some configurations of the present techniques.

FIGS. 3a to 3c schematically illustrate details of the lookup by control circuitry 62 in the pattern storage circuitry 60. The pattern storage circuitry 60 store a plurality of prefetch patterns. Each of the plurality of prefetch patterns includes a trigger access request, pattern information, an access count indicating how many times that prefetch pattern has been selected for training during the training period, and a back-off count indicating a number of times that the pattern is to be overlooked for training. FIGS. 3a to 3c schematically illustrate the sequential receipt of three trigger access patterns and the response of the control circuitry 62 to those trigger access patterns.

In FIG. 3a, the prefetch patterns include: a first prefetch patter identified based on trigger access request (0) which is associated with pattern information (0), an access counter of 0001 and a back-off count of 0000; a second prefetch pattern identified based on trigger access request (1) which is associated with pattern information (1), an access counter of 0010 and a back-off count of 0100; and a further prefetch patter identified based on trigger access request (N) which is associated with pattern information (N), an access counter of 0011 and a back-off count of 0010. The control circuitry 62 receives a trigger access request, in the illustrated configuration, the trigger access request that is received is trigger access request (1). The control circuitry 62 is responsive to receipt of the trigger access request to perform a lookup in the pattern storage circuitry 60. In the illustrated configuration, trigger access request (1) is present in the pattern storage circuitry 60 and the corresponding prefetch pattern 64 including the pattern information, access count and back-off count are read out of the pattern storage circuitry 60 and passed to the control circuitry. In the illustrated configuration, the corresponding prefetch pattern 64 includes back-off information 0100 indicating a non-zero back-off period. As a result, the control circuitry 62 overlooks trigger access (1) and does not pass the corresponding prefetch pattern 64 to training circuitry.

FIG. 3b schematically illustrates the storage of prefetch patterns in the pattern storage circuitry 60 subsequent to receipt of trigger access (1) as described in relation to FIG. 3a. The same prefetch patterns are stored as indicated in FIG. 3a. However, the back-off count associated with trigger access (1) has been decremented to 0011 to indicate that trigger access (1) was received but that the corresponding prefetch pattern 64 was overlooked for training. The previous access count value of 0010 is maintained without being incremented because the pattern associated with trigger access (1) was not selected for training. In FIG. 3b another trigger access, trigger access (0), is received by the control circuitry 62. The control circuitry 62 performs a lookup in the pattern storage circuitry 60 and identifies that there is a pattern stored that is associated with trigger access (0). The pattern associated with trigger access (0) is read out as the corresponding trigger access request 66 including pattern information (0), an access count of 0001 and a back-off count of 0000. Because the back-off count is 0000, the corresponding pattern 66 is eligible to be selected for training and is passed to training circuitry.

FIG. 3c schematically illustrates the storage of prefetch patterns in the pattern storage circuitry 60 subsequent to training of the prefetch pattern associated with trigger access (0) which was selected for training in response to the trigger access described in relation to FIG. 3b. The same prefetch patterns are stored as indicated in FIG. 3b. However, the access count associated with trigger access (0) has been incremented to 0010 to indicate that trigger access (0) was received and was selected for training. The back-off counter associated with trigger access request (0) is set based on the access count. In the illustrated configuration, the back-off counter is set to a linear multiple of the access count. Specifically, the back-off counter is set to twice the access count, i.e., 0100. In FIG. 3c a further trigger access request is received. In this case, the received trigger access request is trigger access (0). The control circuitry 62 performs a lookup of the trigger access request in the pattern storage circuitry 60 and identifies the pattern associated with trigger access (0) as the corresponding prefetch pattern 68. Because the corresponding prefetch pattern 68 was recently selected for training, the back-off counter is non-zero and the corresponding prefetch pattern 68 is overlooked for training. The control circuitry is responsive to the determination to overlook the corresponding prefetch pattern 68 to decrement the back-off counter (not illustrated).

Figure 4:
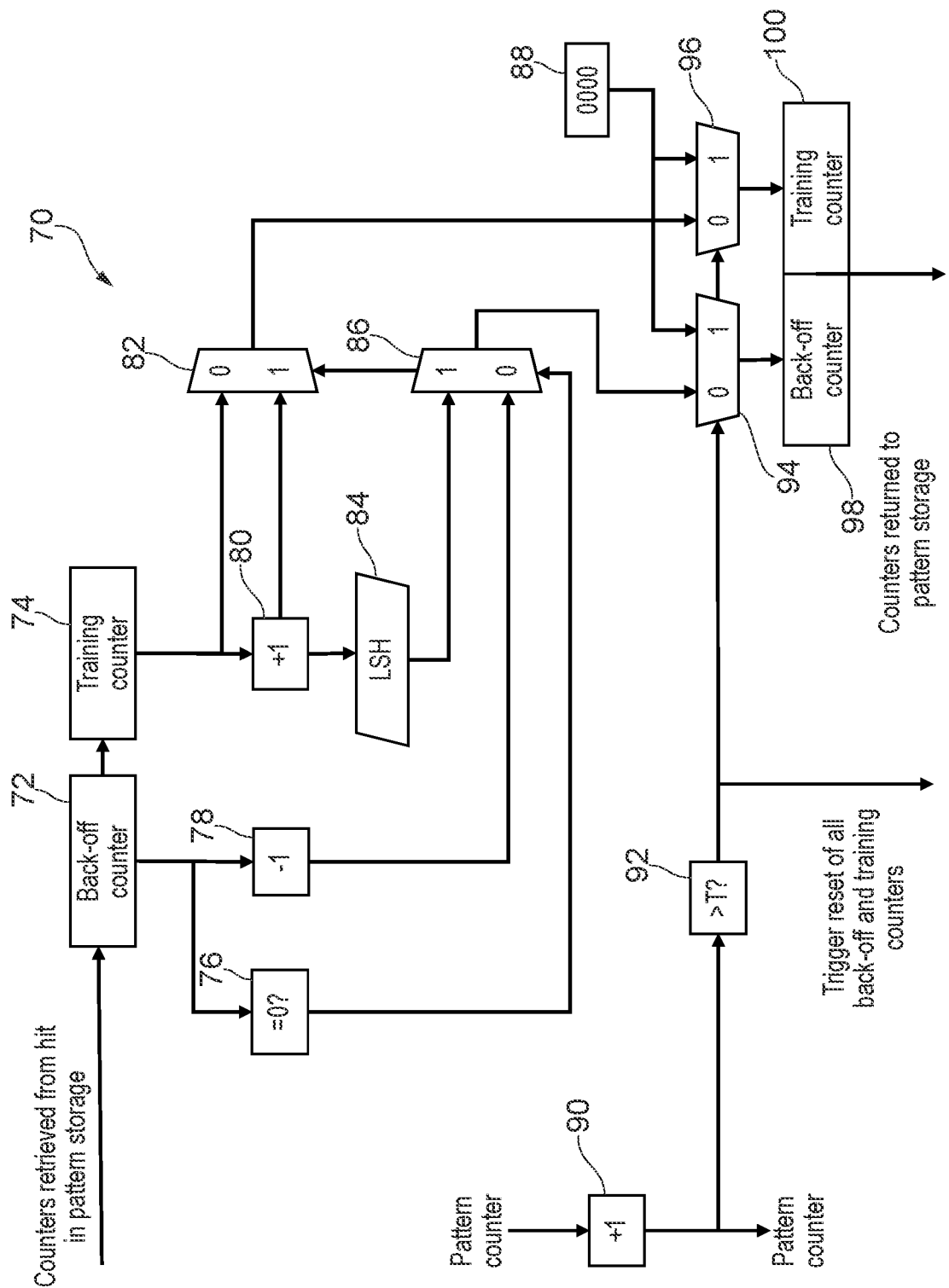
FIG. 4 schematically illustrates updating of counters according to some configurations of the present techniques.

FIG. 4 schematically illustrates further details of the determination performed by control circuitry 70 in response to receipt of a prefetch pattern from the pattern storage circuitry (i.e., in response to a trigger access request hitting in the pattern storage circuitry). The control circuitry 70 receives a back-off counter 72 and a training counter 74 (otherwise referred to as the access count). The back-off counter 72 is fed into threshold circuitry 76 and decrement circuitry 78. The threshold circuitry 76 determines whether the back-off counter 72 is equal to zero. If the back-off counter 72 is equal to zero, then the threshold circuitry 76 outputs a logical one, otherwise the back-off counter outputs a logical zero. The decrement circuitry 78 subtracts one from the value of the back-off counter 72 and passes the value to de-multiplexing circuitry 86. The training counter 74 is passed to de-multiplexing circuitry 82 and to increment circuitry 80. The increment circuitry increments the training counter by one and outputs the result to the de-multiplexing circuitry 82 and to left shift circuitry 84. The left shift circuitry 84 left shifts the value of the incremented training counter 74 by one place and outputs the value to de-multiplexing circuitry 86.

The operation of both de-multiplexing circuitry 82 and de-multiplexing circuitry 86 is determined based on the output of threshold circuitry 76. When the threshold circuitry 76 outputs a logical one (indicating that the back-off counter is equal to zero), the de-multiplexing circuitry 86 outputs the value of left shift circuitry 84 (the left shift of the incremented training counter 74), and the de-multiplexing circuitry 82 outputs the value of the training counter 74 incremented by one. When the threshold circuitry 76 outputs a logical zero (indicating that the back-off counter is not equal to zero), the de-multiplexing circuitry 86 outputs the value of the decremented back-off counter 72, and the de-multiplexing circuitry 82 outputs the value of the training counter 74. The output of de-multiplexing circuitry 82 is therefore the training counter which is incremented by one when the back-off counter is zero and the corresponding pattern is selected for training and otherwise remains the same. The output of de-multiplexing circuitry 86 provides an updated value for the back-off counter and is equal to the left shifted value of the new training counter when the back-off counter 72 is zero and is equal to the decremented back-off counter otherwise.

The output of the de-multiplexing circuitry 82 is fed into the de-multiplexing circuitry 96 along with a zero input 88. The output of the de-multiplexing circuitry 86 is fed into the de-multiplexing circuitry 94 along with the zero input 88. The counters (the back-off counter 72 and the training counter 74) are each reset once the number of patterns reaches a threshold T. On receipt of the counters from a hit in the pattern storage, a pattern counter is incremented by increment circuitry 90 to determine a new pattern counter. The new pattern counter is fed into threshold circuitry 92 to determine if the new pattern counter is greater than the threshold T. The output of the threshold circuitry 92 is a logical one if the new pattern counter is greater than the threshold T and is a logical zero if the new pattern counter is less than the threshold T. The output of the threshold circuitry is used to switch the de-multiplexing circuitry 94 and the de-multiplexing circuitry 96. When the output of the threshold circuitry 92 is a logical one, the de-multiplexing circuitry 94 and the de-multiplexing circuitry 96 each output the zero value 88. When the output of the threshold circuitry 92 is a logical zero, the de-multiplexing circuitry 94 outputs the new back-off counter received from the de-multiplexing circuitry 86. In addition, when the output of the threshold circuitry 92 is a logical one, the control circuitry 70 triggers all back-off counters and all training counters stored in the pattern storage to be reset. The output of the de-multiplexing circuitry 94 is used as the modified back-off counter 98 to be stored in association with that access pattern. When the output of the threshold circuitry 92 is a logical zero, the de-multiplexing circuitry 96 outputs the new training counter received from the de-multiplexing circuitry 82. The output of the de-multiplexing circuitry 96 is used as the modified training counter 100 to be stored in association with that access pattern.

It will be readily apparent to the skilled person that the pattern counter may also be reset in response to the threshold being exceeded. This may involve an explicit resetting of the bits defining the pattern counter of may involve the pattern counter rolling over from its maximum value. Whilst, in the illustrated configuration, the threshold determination circuitry 92 receives an input from the increment circuitry 90, it will be readily apparent to the skilled person that the determination may also be based on the un-incremented pattern counter. Furthermore, the separate resetting of back-off counter 98 and training counter 100 using de-multiplexing circuitry 94, de-multiplexing circuitry 96 and zero value 88 could be omitted with the counters all being reset simultaneously in response to the output of threshold comparison circuit 92. The logical steps set out in FIG. 4 are for illustrative purpose only, and the particular arrangement of circuitry required to achieve the defined function may be arranged differently with one or more alternative components. For example, the output of the comparator circuitry 76 and the threshold circuitry 92 may be switched along with the corresponding inputs to the de-multiplexing circuitry. Furthermore, one or more steps of the calculation may be omitted based on the value of the comparator circuitry 76. For example, where the comparator circuitry outputs a logical zero, the left shift circuitry 84 and the increment circuitry 80 could be disabled.

Figure 5:
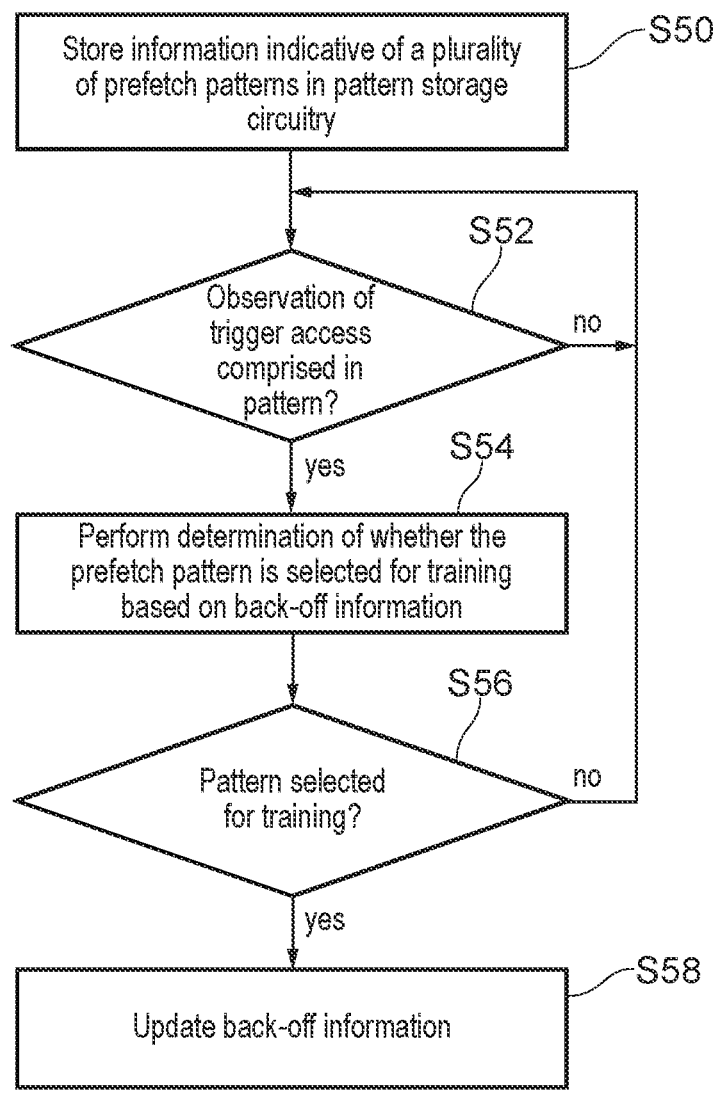
FIG. 5 schematically illustrates a sequence of steps carried out by an apparatus according to some configurations of the present techniques.

FIG. 5 schematically illustrates a sequence of steps carried out by the apparatus according to some configurations of the present techniques. Flow begins at step S50 where information indicative of a plurality of prefetch patterns is stored in pattern storage circuitry. Flow then proceeds to step S52 where it is determined if a trigger access pattern comprised in one of the prefetch patterns has been observed. The determination may be based on a lookup in the pattern storage circuitry, for example, based on a hash of an address of the trigger access request. If, at step S52, it is determined that no trigger access pattern comprised in one of the prefetch patterns has been observed, then flow remains at step S52. If, at step S52, it is determined that a trigger access pattern comprised in one of the prefetch patterns has been observed, then flow proceeds to step S54. At step S54, a determination of whether the prefetch pattern observed in step S52 is selected for training based on back-off information comprised with the pattern information in the pattern storage circuitry. Flow then proceeds to step S56 where it is determined if the pattern is selected for training. If at step S56, it is determined that the pattern is not selected for training, then flow returns to step S52. If, at step S56, it is determined that the pattern is selected for training, then flow proceeds to step S58 where the back-off information comprised in the prefetch pattern is updated.

Figure 6:
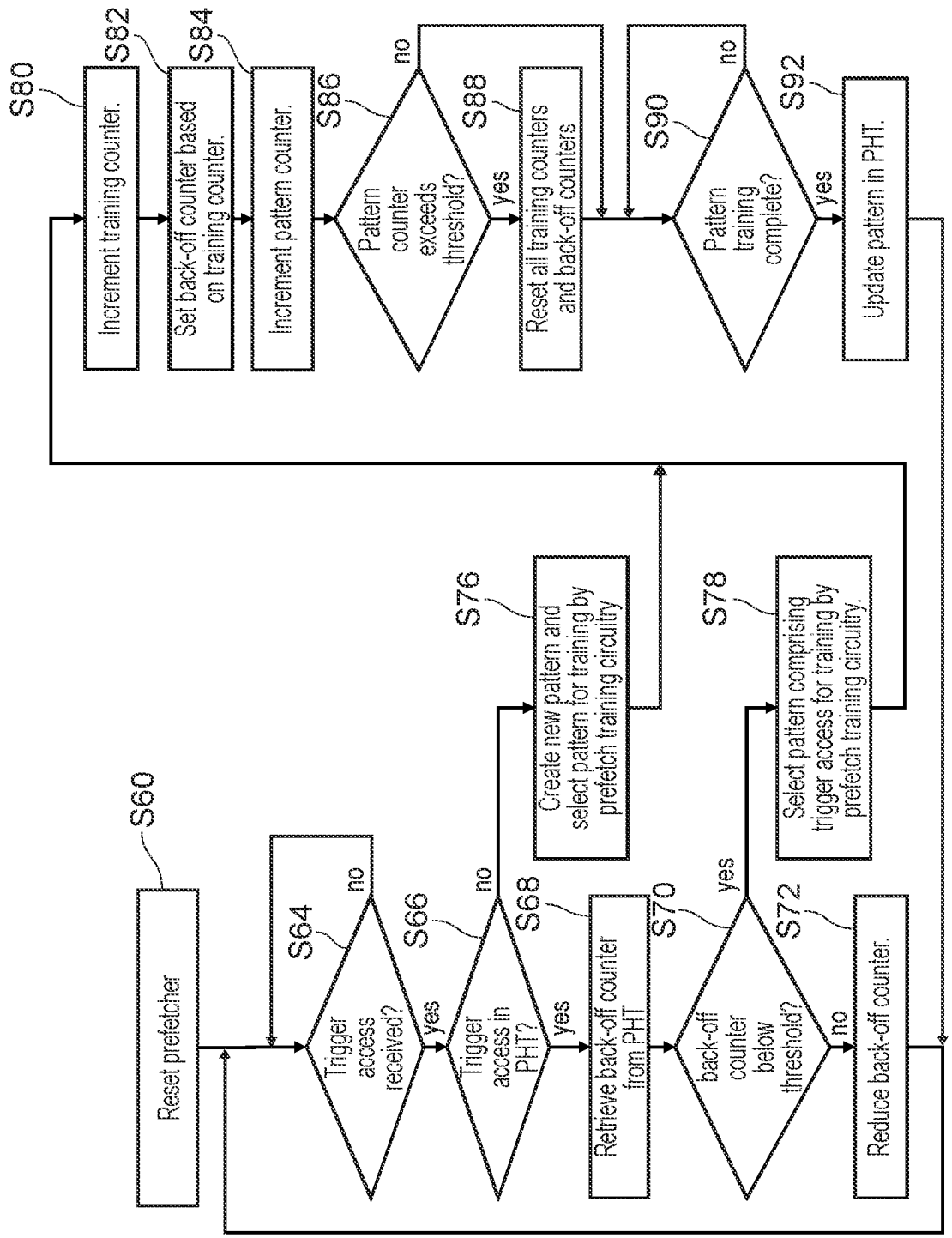
FIG. 6 schematically illustrates a sequence of steps carried out by an apparatus according to some configurations of the present techniques.

FIG. 6 schematically illustrates further details of steps carried out by an apparatus according to some configurations of the present techniques. Flow begins at step S60 where the prefetcher is reset or initiated and all counters (the access counter, the back-off counter, and the pattern counter) are reset. Flow then proceeds to step S64 where it is determined if a trigger access request has been received. If, at step S64, it is determined that no trigger access request has been received, then flow remains at step S64. If, at step S64, it is determined that a trigger access request has been received, then flow proceeds to step S66. At step S66, it is determined if the trigger access is recorded in a pattern history table (PHT) comprised in the pattern storage circuitry. The determination may be made, for example, based on a lookup in the pattern history table based on an address, or a hash of the address, identified in the trigger access request. If, at step S66, it is determined that the trigger access is not in the pattern history table, then flow proceeds to step S76. At step S76, a new pattern is created in the pattern history table and is selected for training by the prefetch training circuitry. Flow then proceeds to step S80. If, at step S66, it was determined that the trigger access is in the pattern history table, then flow proceeds to step S78 where the back-off counter corresponding to that trigger access is retrieved from the pattern history table. Flow then proceeds to step S70 where it is determined if the back-off counter is below a predetermined threshold. If, at step S70, it is determined that the back-off counter is not below a predetermined threshold, then flow proceeds to step S72 where the back-off counter is reduced before flow returns to step S64 without selecting the prefetch pattern for training by the training circuitry. If, at step S70, it is determined that the back-off counter is below the predetermined threshold, then flow proceeds to step S78 where the prefetch pattern comprising the trigger access is selected for training by the prefetch training circuitry. Flow then proceeds to step S80.

At step S80, a value of the training counter stored in the pattern history table in association with the access request is incremented. Flow then proceeds to step S82 where the back-off counter is set based on the training counter. Flow then proceeds to step S84 where the pattern counter is incremented. Flow then proceeds to step S86 where it is determined whether the pattern counter exceeds a threshold. If, at step S86, it is determined that the pattern counter exceeds a threshold, then flow proceeds to step S88 where all training counters and back-off counters are reset before flow continues to step S90. It, at step S86, it was determined that the pattern counter does not exceed the threshold, then flow proceeds to step S90. At step S90, it is determined whether pattern training is complete. If, at step S90, it is determined that the pattern training is not complete, then flow remains at step S90. If, at step S90, it is determined that the pattern training is complete, then flow proceeds to step S92 where the trained pattern is updated in the pattern history table. Flow then returns to step S64 to await a new access to be sampled.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
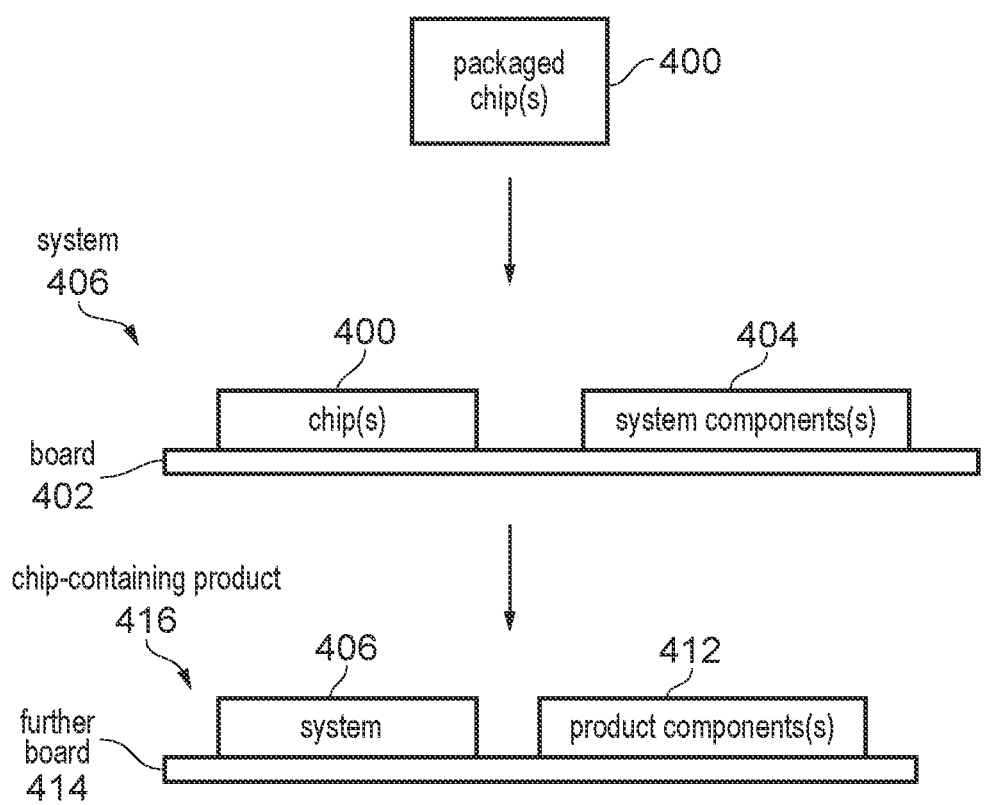
FIG. 7 schematically illustrates a system and a chip containing product according to some configurations of the present techniques.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company. The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in an apparatus comprising execution circuitry having one or more vector processing units for performing vector operations on vectors comprising multiple data elements. Execution circuitry having X vector processing units each configured to perform vector operations on Y bit wide vectors, with the respective vector processing units operable in parallel, may be said to have an XxY bit vector datapath. In some embodiments, the execution circuitry is provided having six or more vector processing units. In some embodiments, the execution circuitry is provided having five or fewer vector processing units. In some embodiments, the execution circuitry is provided having two vector processing units (and no more). In some embodiments, the one or more vector processing units are configured to perform vector operations on 128-bit wide vectors. In some embodiments, the execution circuitry has a 2×128 bit vector datapath. Alternatively, in some embodiments the execution circuitry has a 6×128 bit vector datapath.

Concepts described herein may be embodied in an apparatus comprising a level one data (L1D) cache. The L1D cache is a private cache associated with a given processing element (e.g. a central processing unit (CPU) or graphics processing element (GPU)). In a cache hierarchy of multiple caches capable of caching data accessible by load/store operations processed by the given processing element, the L1D cache is a level of cache in the hierarchy which is faster to access than a level two (L2) cache. In some embodiments, the L1 data cache is the fastest to access is the hierarchy, although even faster to access caches, for example, level zero (L0) caches may also be provided. If a load/store operation hits in the L1D cache, it can be serviced with lower latency than if it misses in the L1D cache and is serviced based on data in a subsequent level of cache or in memory. In some embodiments, the LiD cache comprises storage capacity of less than 96 KB, in one example the LiD cache is a 64 KB cache. In some embodiments, the LiD cache comprises storage capacity of greater than or equal to 96 KB, in one example the LiD cache is a 128 KB cache.

Concepts described herein may be embodied in an apparatus comprising a level two (L2) cache. The L2 cache for a given processing element is a level of cache in the cache hierarchy that, among caches capable of holding data accessible to load/store operations, is next fastest to access after the LiD cache. The L2 cache can be looked up in response to a load/store operation missing in the LiD cache or an instruction fetch missing in an L1 instruction cache. In some embodiments, the L2 cache comprises storage capacity of less than 1536 KB (1.5 MB), in one example the L2 cache is a 1024 KB (1 MB) cache. In some embodiments, the L2 cache comprises storage capacity greater than or equal to 1536 KB and less than 2560 KB (2.5 MB), in one example the L2 cache is a 2048 KB (2 MB) cache. In some embodiments, the L2 cache comprises storage capacity greater than or equal to 2560 KB, in one example the L2 cache is a 3072 KB (3 MB) cache. In some embodiments, the L2 cache has a larger storage capacity than the LiD cache.

Figure 8:
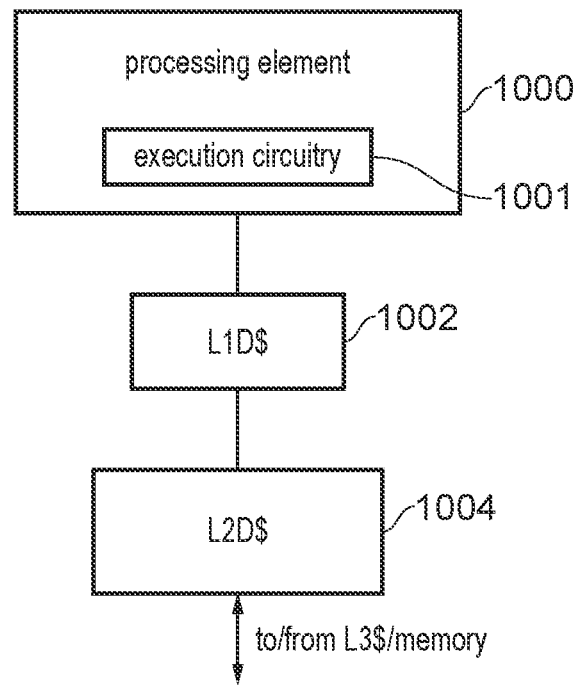
FIG. 8 schematically illustrates a processing element according to some configurations of the present techniques.

FIG. 8 illustrates an example of an apparatus comprising a processing element 1000 (e.g. a CPU or GPU) comprising execution circuitry 1001 for executing processing operations in response to decoded program instructions. The processing element 1000 has access to a LiD cache 1002 and a L2 cache 1004, which are part of a cache hierarchy of multiple caches for caching data from memory that is accessible by the processing element 1000 in response to load/store operations executed by the execution circuitry 1001. The processing element may, for example, be arranged as a processing pipeline 4 indicated in FIG. 1 and may also comprise the prefetch training circuitry and control circuitry arranged, for example, as indicated in FIG. 2. The prefetch training circuitry may be configured to operate as described in relation to FIGS. 1 to 7 above.

Figure 9:
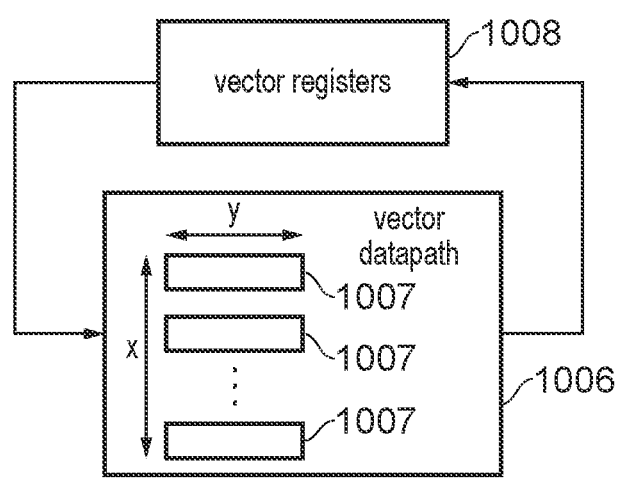
FIG. 9 schematically illustrates a vector datapath according to some configurations of the present techniques.

FIG. 9 illustrates an example of a vector datapath 1006 that may be provided as part of the execution circuitry 1001 of the processing element 1000, and vector registers 1008 for storing vector operands for processing by the vector datapath 1006. Vector operands read from the vector registers 1008 are processed by the vector datapath 1006 to generate vector results which may be written back to the vector registers 1008. The vector datapath 1006 is an XxY bit vector datapath, comprising X vector processing units 1007 each configured to perform vector operations on Y bit vectors. The vector registers 1008 may be accessible as Z bit vector registers, where Z can be equal to Y or different to Y. For a vector operation requiring a Z-bit vector operand where Z is greater than Y, the Z-bit vector operand can be processed using two or more vector processing units 1007 operating in parallel on different portions of the Z-bit vector operand in the same cycle and/or using multiple passes through the vector datapath in two or more cycles. For vector operations requiring a Z-bit vector operand where Z is less than Y, a given vector processing unit 1007 can process two or more vectors in parallel.

In brief overall summary there is provided an apparatus, a system, a chip containing product, a method, and a computer-readable medium. The apparatus comprises pattern storage circuitry to store information indicative of a plurality of prefetch patterns, each prefetch pattern indicating a trigger access request and comprising pattern information associated with the trigger access request. The pattern information is indicative of one or more addresses to be used for generation of prefetch requests. The apparatus also comprises control circuitry responsive to an observation of the trigger access request indicated in a prefetch pattern to determine whether the prefetch pattern is selected for training by prefetch training circuitry. Each of the plurality of prefetch patterns comprises back-off information indicating a back-off period during which the prefetch pattern is to be overlooked for the training. The control circuitry is responsive to the prefetch pattern being selected for the training to update the back-off information.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:
　pattern storage circuitry configured to store information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry; and
　control circuitry responsive to an observation of the trigger access request indicated in a prefetch pattern of the plurality of prefetch patterns to perform a determination of whether the prefetch pattern is selected for training by prefetch training circuitry,
　wherein:
　each of the plurality of prefetch patterns comprises back-off information indicating a back-off period during which the prefetch pattern is to be overlooked for the training; and
　the control circuitry is responsive to the prefetch pattern being selected for the training to update the back-off information.

Clause 2. The apparatus of clause 1, wherein a duration of the back-off period is variable.

Clause 3. The apparatus of clause 2, wherein the control circuitry is configured, when updating the back-off information, to vary the duration of the back-off period in dependence on a number of times the prefetch pattern has been selected for training during a training window.

Clause 4. The apparatus of clause 3, wherein the duration is dependent on a training counter associated with the prefetch pattern, the training counter indicative of the number of times the prefetch pattern has been selected for the training during the training window.

Clause 5. The apparatus of clause 3 or clause 4, wherein the training window comprises a predetermined number of prefetch patterns being selected for the training.

Clause 6. The apparatus of any of clauses 3 to 5, wherein updating the back-off information comprises setting the duration to an integer multiple of the training counter.

Clause 7. The apparatus of any of clauses 3 to 5, wherein updating the back-off information comprises setting the duration such that a logarithm of the duration is linearly related to the training counter.

Clause 8. The apparatus of any preceding clause, wherein the control circuitry, when performing the determination, is responsive to the back-off information indicating a non-zero back-off period, to overlook the prefetch pattern and to decrease the back-off period.

Clause 9. The apparatus of any preceding clause, wherein the control circuitry is configured to reset the back-off information associated with each of the plurality of prefetch patterns in response to a predetermined condition being met.

Clause 10. The apparatus of clause 9, wherein the predetermined condition is met when a total number of prefetch patterns selected for the training has exceeded a selected prefetch pattern threshold.

Clause 11. The apparatus of clause 9, wherein the predetermined condition is met when a combination of a total number of prefetch patterns selected for training and a total number of prefetch patterns overlooked for training has exceeded a total prefetch pattern threshold.

Clause 12. The apparatus of any preceding clause, wherein the back-off period is determined based on a configurable parameter.

Clause 13. The apparatus of any preceding clause, comprising prefetch generation circuitry responsive to receipt of an access request to perform a lookup in the pattern storage circuitry to determine if the access request corresponds to a trigger access request indicated in one of the plurality of prefetch patterns, wherein the prefetch generation circuitry is responsive to the lookup resulting in a hit, to generate the prefetch requests based on the one or more addresses indicated in the prefetch pattern of the plurality of prefetch patterns that resulted in the hit.

Clause 14. The apparatus of clause 13, wherein the prefetch generation circuitry is one of:
　a spatial prefetcher;
　a temporal prefetcher; and/or
　an indirect prefetcher.

Clause 15. The apparatus of any preceding clause, wherein the pattern storage circuitry is updated in response to completion of the training.

Clause 16. The apparatus of any preceding clause, wherein the training comprises recording information indicative of the one or more addresses observed subsequent to the trigger access request.

Clause 17. The apparatus of any preceding clause, comprising execution circuitry comprising a 6×128 bit vector datapath.

Clause 18. A system comprising:
　the apparatus of any preceding clause, implemented in at least one packaged chip;
　at least one system component; and
　a board,
　wherein the at least one packaged chip and the at least one system component are assembled on the board.

Clause 19. A chip-containing product comprising the system of clause 18, wherein the system is assembled on a further board with at least one other product component.

Clause 20. A method comprising:
　storing, in pattern storage circuitry, information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry;
　in response to an observation of the trigger access request indicated in a prefetch pattern of the plurality of prefetch patterns performing a determination of whether the prefetch pattern is selected for training by prefetch training circuitry,
　wherein each of the plurality of prefetch patterns comprises back-off information indicating a back-off period during which the prefetch pattern is to be overlooked for the training; and in response to the prefetch pattern being selected for the training updating the back-off information.

Clause 21. A non-transitory computer-readable medium storing computer-readable code for fabrication of the apparatus comprising the apparatus of any of clauses 1 to 19.

We claim:

1. An apparatus comprising:
   pattern storage circuitry configured to store information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry; and
   control circuitry responsive to an observation of the trigger access request indicated in a prefetch pattern of the plurality of prefetch patterns to perform a determination of whether the prefetch pattern is selected for training by prefetch training circuitry,
   wherein:
   each of the plurality of prefetch patterns comprises back-off information indicating a back-off period during which the prefetch pattern is to be overlooked for the training; and
   the control circuitry is responsive to the prefetch pattern being selected for the training to update the back-off information.

2. The apparatus of claim 1, wherein a duration of the back-off period is variable.

3. The apparatus of claim 2, wherein the control circuitry is configured, when updating the back-off information, to vary the duration of the back-off period in dependence on a number of times the prefetch pattern has been selected for training during a training window.

4. The apparatus of claim 3, wherein the duration is dependent on a training counter associated with the prefetch pattern, the training counter indicative of the number of times the prefetch pattern has been selected for the training during the training window.

5. The apparatus of claim 3, wherein the training window comprises a predetermined number of prefetch patterns being selected for the training.

6. The apparatus of claim 3, wherein updating the back-off information comprises setting the duration to an integer multiple of the training counter.

7. The apparatus of claim 3, wherein updating the back-off information comprises setting the duration such that a logarithm of the duration is linearly related to the training counter.

8. The apparatus of claim 1, wherein the control circuitry, when performing the determination, is responsive to the back-off information indicating a non-zero back-off period, to overlook the prefetch pattern and to decrease the back-off period.

9. The apparatus of claim 1, wherein the control circuitry is configured to reset the back-off information associated with each of the plurality of prefetch patterns in response to a predetermined condition being met.

10. The apparatus of claim 9, wherein the predetermined condition is met when a total number of prefetch patterns selected for the training has exceeded a selected prefetch pattern threshold.

11. The apparatus of claim 9, wherein the predetermined condition is met when a combination of a total number of prefetch patterns selected for training and a total number of prefetch patterns overlooked for training has exceeded a total prefetch pattern threshold.

12. The apparatus of claim 1, wherein the back-off period is determined based on a configurable parameter.

13. The apparatus of claim 1, comprising prefetch generation circuitry responsive to receipt of an access request to perform a lookup in the pattern storage circuitry to determine if the access request corresponds to a trigger access request indicated in one of the plurality of prefetch patterns,
   wherein the prefetch generation circuitry is responsive to the lookup resulting in a hit, to generate the prefetch requests based on the one or more addresses indicated in the prefetch pattern of the plurality of prefetch patterns that resulted in the hit.

14. The apparatus of claim 13, wherein the prefetch generation circuitry is one of:
   a spatial prefetcher;
   a temporal prefetcher; and/or
   an indirect prefetcher.

15. The apparatus of claim 1, wherein the pattern storage circuitry is updated in response to completion of the training.

16. The apparatus of claim 1, comprising execution circuitry comprising a 6×128 bit vector datapath.

17. A system comprising:
   the apparatus of claim 1, implemented in at least one packaged chip;
   at least one system component; and
   a board,
   wherein the at least one packaged chip and the at least one system component are assembled on the board.

18. A chip-containing product comprising the system of claim 17, wherein the system is assembled on a further board with at least one other product component.

19. A method comprising:
   storing, in pattern storage circuitry, information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry;
   in response to an observation of the trigger access request indicated in a prefetch pattern of the plurality of prefetch patterns performing a determination of whether the prefetch pattern is selected for training by prefetch training circuitry,
   wherein each of the plurality of prefetch patterns comprises back-off information indicating a back-off period during which the prefetch pattern is to be overlooked for the training; and
   in response to the prefetch pattern being selected for the training updating the back-off information.

20. A non-transitory computer-readable medium storing computer-readable code for fabrication of an apparatus comprising:
   pattern storage circuitry configured to store information indicative of a plurality of prefetch patterns, each of the plurality of prefetch patterns indicating a trigger access request and comprising pattern information associated with the trigger access request, the pattern information indicative of one or more addresses to be used for generation of prefetch requests to prefetch data into local storage circuitry in advance of a demand request for the data by processing circuitry; and control circuitry responsive to an observation of the trigger access request indicated in a prefetch pattern of the plurality of prefetch patterns to perform a determination of whether the prefetch pattern is selected for training by prefetch training circuitry, wherein:

each of the plurality of prefetch patterns comprises back-off information indicating a back-off period during which the prefetch pattern is to be overlooked for the training; and the control circuitry is responsive to the prefetch pattern being selected for the training to update the back-off information.

\* \* \* \* \*